United States Patent
Agarwal et al.

(10) Patent No.: US 11,005,853 B1
(45) Date of Patent: May 11, 2021

(54) RESTRICTION TRANSITIVITY FOR SESSION CREDENTIALS

(71) Applicant: Amazon Technologies, Inc., Reno, NV (US)

(72) Inventors: Ankur Agarwal, Seattle, WA (US); Praveen Akinapally, Seattle, WA (US); Conor Patrick Cahill, Waterford, VA (US); Dmitry Frenkel, Bothell, WA (US); Rachit Jain, Bothell, WA (US); Lennart Christopher Leon Kats, Amsterdam (NL); Julian Eric Naydichev, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 200 days.

(21) Appl. No.: 15/912,982

(22) Filed: Mar. 6, 2018

(51) Int. Cl.
*H04L 29/00* (2006.01)
*H04L 29/06* (2006.01)

(52) U.S. Cl.
CPC ............ *H04L 63/107* (2013.01); *H04L 63/08* (2013.01)

(58) Field of Classification Search
CPC ............................ H04L 63/107; H04L 63/08
See application file for complete search history.

(56) References Cited

U.S. PATENT DOCUMENTS

| | | | |
|---|---|---|---|
| 7,051,029 B1 * | 5/2006 | Fayyad | G06F 16/955 |
| 8,959,650 B1 * | 2/2015 | Richards | G06F 21/44 |
| | | | 709/227 |
| 9,038,886 B2 * | 5/2015 | Hammad | G06F 21/34 |
| | | | 235/375 |
| 9,317,848 B2 * | 4/2016 | Hammad | G06F 21/34 |
| 9,519,696 B1 * | 12/2016 | Roth | G06F 16/258 |
| 9,992,183 B2 * | 6/2018 | Engelhart | H04L 63/08 |
| 10,097,546 B2 * | 10/2018 | Hao | H04L 63/0876 |
| 10,331,895 B1 * | 6/2019 | Roth | G06F 21/6209 |
| 10,387,871 B2 * | 8/2019 | Hammad | G06Q 20/12 |
| 10,389,759 B2 * | 8/2019 | Khan | H04L 63/0236 |
| 2005/0149726 A1 * | 7/2005 | Joshi | G06F 21/51 |
| | | | 713/164 |
| 2007/0207782 A1 * | 9/2007 | Tran | H04L 29/06027 |
| | | | 455/414.1 |
| 2007/0253553 A1 * | 11/2007 | Abdul Rahman | G06F 21/31 |
| | | | 380/259 |
| 2008/0109365 A1 * | 5/2008 | Kulkarni | H04L 63/08 |
| | | | 705/55 |

(Continued)

*Primary Examiner* — Don G Zhao
(74) *Attorney, Agent, or Firm* — Hogan Lovells US LLP

(57) ABSTRACT

Transitive restrictions can be applied to requests received on a session. A session token can be issued for an active session, and a transitivity setting specified to indicate the types of requests for which the transitive restriction is to be enforced. This can include enforcing the restriction on requests received from outside a trusted environment, requests within a scope of enforcement, or enforcing the restriction at request authentication. Any request received from an untrusted source that fails to satisfy the transitive restriction will be denied. Requests from inside the trusted environment may not have the transitive restriction enforced, such as where a new token is issued. This enables services within the environment to make calls on behalf of the customer, while ensuring that third parties obtaining the session token cannot successfully initiate such calls.

15 Claims, 6 Drawing Sheets

(56) References Cited

U.S. PATENT DOCUMENTS

| | | | |
|---|---|---|---|
| 2008/0159318 A1* | 7/2008 | Pierlot | G06F 21/335 370/412 |
| 2009/0238176 A1* | 9/2009 | Yang | H04L 65/4007 370/352 |
| 2010/0149974 A1* | 6/2010 | Ohtsu | H04L 65/1016 370/230 |
| 2010/0167706 A1* | 7/2010 | Ohtsu | H04L 12/1895 455/414.1 |
| 2010/0246468 A1* | 9/2010 | Santhanam | H04W 48/04 370/312 |
| 2010/0248742 A1* | 9/2010 | Song | H04L 12/185 455/456.1 |
| 2011/0134804 A1* | 6/2011 | Maes | H04M 7/0012 370/259 |
| 2012/0243547 A1* | 9/2012 | Pardo-Blazquez | H04L 12/14 370/401 |
| 2012/0254957 A1* | 10/2012 | Fork | G06F 21/33 726/6 |
| 2013/0013507 A1* | 1/2013 | Browning | G06Q 20/405 705/44 |
| 2013/0247164 A1* | 9/2013 | Hoggan | H04W 12/06 726/8 |
| 2014/0082695 A1* | 3/2014 | Alsina | H04L 29/06 726/3 |
| 2014/0195626 A1* | 7/2014 | Ruff | H04L 63/104 709/206 |
| 2014/0280994 A1* | 9/2014 | Khan | H04L 63/20 709/229 |
| 2014/0282940 A1* | 9/2014 | Williams | H04L 63/0815 726/6 |
| 2014/0380417 A1* | 12/2014 | Cucinotta | H04L 63/101 726/3 |
| 2015/0113588 A1* | 4/2015 | Wing | H04L 63/0227 726/1 |
| 2017/0041296 A1* | 2/2017 | Ford | H04W 12/06 |
| 2017/0061436 A1* | 3/2017 | Liu | G06Q 20/32 |
| 2018/0062832 A1* | 3/2018 | Hatcher | G06F 21/602 |
| 2018/0159940 A1* | 6/2018 | Hultkrantz | H04L 67/141 |
| 2019/0109857 A1* | 4/2019 | Caffary, Jr. | H04L 63/083 |
| 2019/0132131 A1* | 5/2019 | Clements | G06F 21/31 |
| 2019/0213462 A1* | 7/2019 | McDonald | G06Q 30/00 |

* cited by examiner

RESTRICTION TRANSITIVITY FOR SESSION CREDENTIALS

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access to many different users, various types of credentials can be used to authenticate a source of the request, as well as to demonstrate that the source is authorized to access a resource to perform a task. These credentials can potentially be obtained by unintended third parties, who can gain unauthorized access to the resource environment, as well as the data and content stored therein. In order to minimize this potential problem, credentials can be given various restrictions to minimize the ability of an unauthorized third party to utilize the credentials. Unfortunately, these restrictions can prevent certain other authorized uses of the credentials that are to be performed on behalf of the users authorized for those credentials.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of security credentials in an electronic environment. In particular, various approaches provide for the application of transitive restrictions for processing requests. A session token, or other such credential, can be issued for use on an active session. A transitivity value can be specified to indicate the types of requests for which the transitive restriction is to be enforced. This can include, for example, enforcing address restrictions on calls or requests received from outside a trusted resource environment, such as a set of resources under complete control of a single entity or provider. In some embodiments, a trusted environment can allow some types of access by external parties, but those parties have little or no ability to make modifications to resources within the trusted environment. Any resource for which a customer has the ability to make certain changes, such as for customers having bare metal access to a resource, can cause that resource to be considered to be untrusted, or outside the trusted environment as discussed elsewhere herein. In other embodiments the source address restriction can be set to be enforced at authentication. In still other embodiments, calls from inside the trusted environment can be issued a new session token for which the restriction is not to be enforced. In this way, any request from an external or untrusted entity that requires authentication using the session token will also have the source address restriction enforced, such that the calls or requests will be denied if the source address falls outside the permissible range of the restriction. For other calls or requests from inside the trusted environment that include the session token but do not require authentication, of include a new token, the source address restriction will not be enforced. This enables services within the environment to make calls on behalf of the customer, while ensuring that third parties obtaining the session token cannot initiate such calls as the initial call from the third party will fail the address restriction upon authentication.

Various other such functions can be used as well within the scope of the various embodiments as would be apparent to one of ordinary skill in the art in light of the teachings and suggestions contained herein.

Figure 1:
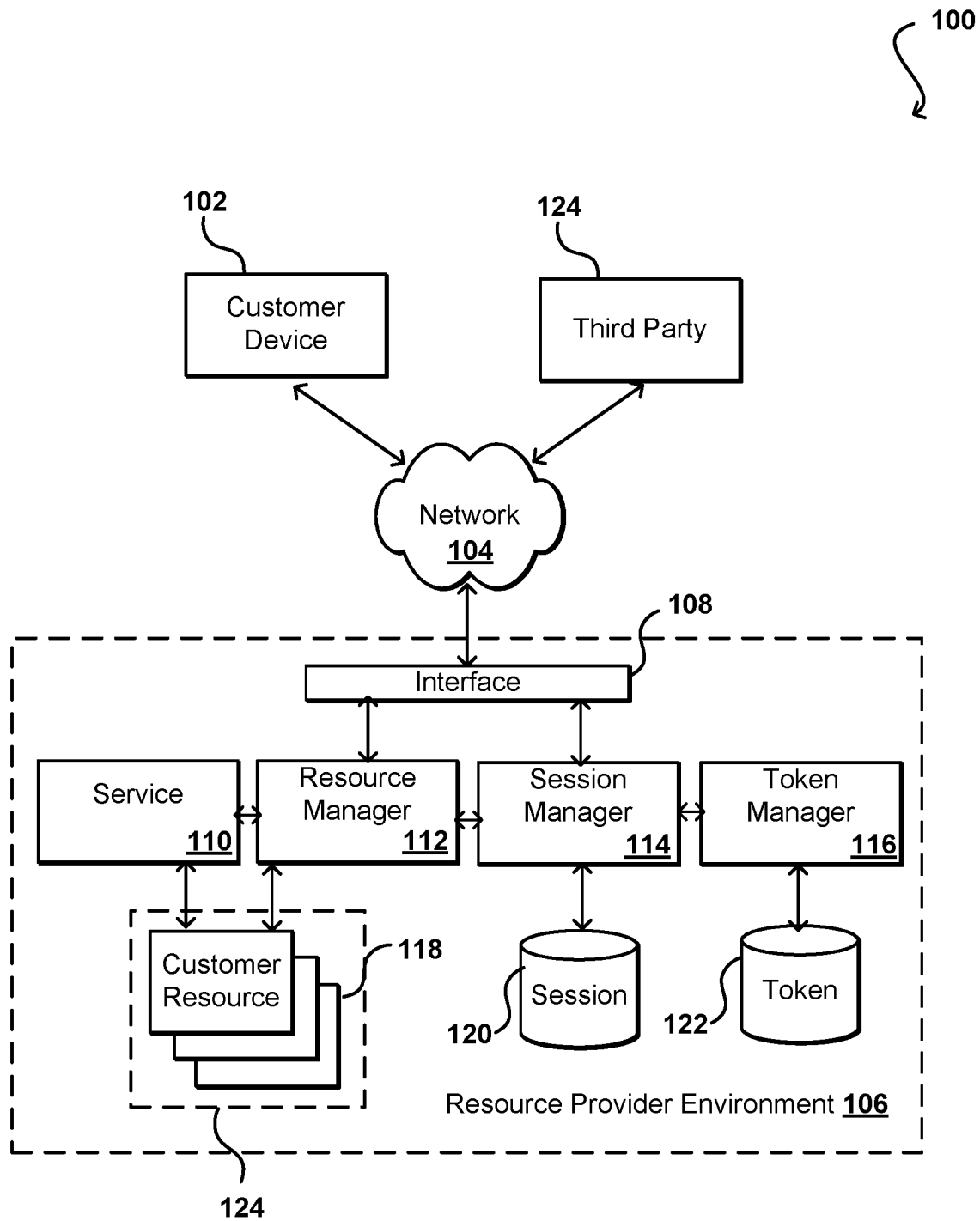
FIG. 1 illustrates an example environment in which various embodiments can be implemented.

FIG. 1 illustrates an example environment 100 in which aspects of the various embodiments can be implemented. In this example a user, such as a customer having an account with a resource provider, is able to utilize a customer device 102 to submit requests across at least one network 104 to a resource provider environment 106. The customer device 102 can include any appropriate client device operable to send and receive requests, messages, or other such information over an appropriate network and convey information back to a user of the device. Examples of such client devices include personal computers, tablet computers, smart phones, notebook computers, wearable computers (e.g., smart watches and goggles), and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing,"

among other such terms and depending upon the specific environment and/or implementation. In this example the provider environment includes a plurality of electronic resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein. Resources, or portions of resources, allocated for use by a specific customer or under a specific customer account are represented as customer resources 118 in the FIG. 1.

A request from the customer device 102 can be received to an interface layer 108 of the resource provider environment 106, such as to a specified application programming interface (API). The API can then work with other components of the interface layer to route the request to the appropriate location. In some embodiments, a request may involve accessing specified customer resources 118. Unless the request is received on a current session for that customer, information for the request can be passed to a session manager 114 that can be configured to initiate a customer session under which access to the customer resources 118 can be obtained. In at least some embodiments, the request from the customer device 102 will include one or more credentials, such as a username and password pair or other such identifiers, that can be passed to an authentication service, for example, to verify the identity of the customer device, or a user of the customer device. Approaches for authenticating a source of a request are well known in the art and, as such, will not be discussed in detail herein. Once authenticated, a session can be initiated by the session manager 114 during which the customer device 102 can access any of the customer resources 118 for which the customer device is authorized under the customer account. Information for the session can be stored to a session data store 120 or other such location.

In order to avoid having to perform an authentication for each received request, as well as to enable calls to be made and verified within the resource provider environment, a session token can be generated and provided to the customer device 102. The customer device can then include the session token with any future calls or requests on the session. The session manager can contact a token manager 116, for example, that can generate a session token and provide that session token to the customer device 102. The token manager can also store information for the token to a token repository 122, or other such location, for use in verifying the session token when received from the customer device for future requests on the session. A session token in some embodiments takes the form of a session identifier that can be included with stateless communications in order to manage various communications received and transmitted on a session. The session token or identifier can take any appropriate form, such as a randomly generated string or hash that can be stored on the customer device, such as in the form of a cookie. The session can alternatively be stored in cache memory on the computer device and included in a header or as metadata for subsequent requests on the session, among other such options. A session token can be used to authenticate a subsequent request received from outside the resource provider environment, which can then be processed with respect to the corresponding customer resources 118. As mentioned, this can involve comparing the token received with the request against the token information stored in the token data store 122 for the current session. As known for such purposes, sessions and tokens may expire so there may be one or more mechanisms used for refreshing the token or issuing a new token at a future point in time.

In some instances, there will be calls made within the resource provider environment 106 on behalf of the customer for the customer session. This can include, for example, calls from the customer resources 118 to one or more services 110, such as Web services, that are executing within the environment. Various types of functionality can be offered through such services as would be apparent to one of ordinary skill in the art. This can also include calls from various services 110 in the environment to access the customer resources 118, such as to access customer data stored by those resources. In various embodiment, the session token can be passed with any or all of these requests for purposes of identifying the session under which the call is being made, as well as providing evidence of an authenticated identity associated with the requests.

As known for such tokens and credentials, however, there is a chance that an unauthorized third party 124 may come into possession of a session token. A third party possessing an active session token can potentially use that session token to gain access to the customer resources 118, including data stored by those resources. The third party can also potentially instruct actions to be executed by those resources as long as the session token is included with the calls instructing those actions. Accordingly, various approaches can place restrictions on the usage of session tokens. One such approach is a source address restriction, such as where calls received across an Internet connection are only accepted and processed if the Internet Protocol (IP) address is within a range of IP addresses associated with the customer device 102 or customer account. Such a restriction is referred to herein as an IP address restriction or source address restriction. By enforcing such a restriction, a third party 124 obtaining a valid session token will typically be prevented from using that session token to gain access because the IP address associated with the third party device 124 will be outside the permissible range associated with the customer account. Various other transitive restrictions can be applied as well as discussed herein, as may relate to a communications path, a type of end point, a hardware token or other out-of-band proof of identity, a date or time of the request, or an instance identifier, among other such options.

Such restrictions could potentially have undesired impact on the actions capable of being performed on the customer session. As mentioned, there may be calls made on behalf of a customer or customer account that will utilize the session token, but will not originate from an IP address associated with the customer account. By enforcing such a restriction, calls from a service 110 to a customer resource 118 would be denied, even if the service 110 is performing a valid request or action authorized on behalf of the customer account. It would be desirable in at least some situations to apply the restriction on specific callers, such as customer devices 102, customer resources 118, and third party devices 124, while not applying or enforcing the restriction on components or services internal to, or at least having a trusted status with, the resource provider environment.

Accordingly, approaches in accordance with various embodiments can provide for transitive restrictions (or "transitivity" restrictions) with respect to session tokens and other such credentials. The transitive restrictions can be enforced on certain types of calls, as may be determined by a specified scope of the restriction, or for calls received from outside a trusted environment, among other such options. In some embodiments, the transitive restrictions are enforced during authentication, which will typically involve an initial call from a source such as a customer, customer resource, or third party. Such an approach enables the source address restriction to be selectively enforced for certain types of calls or calls that include session tokens, or other session credentials, for which the transitivity setting specifies that any transitive restriction is to be enforced.

In some embodiments, the token manager 116 in FIG. 1 can take the form of a public facing web service that can enable a customer to request temporary, limited-privilege credentials for users under a specified customer account. These credentials can take the form of a session token as discussed herein. In some instances the session tokens can also be provided to federated users, or other users authorized under the relevant customer account. The session manager 114 can cause session tokens to be issued that have transitive restrictions, such as source IP address restrictions, applied on calls from various types of sources. As mentioned, this can include calls from external client devices into the resource provider environment 106. The same session token can then be used inside the resource provider environment 106 to make calls on behalf of the customer. This can include, for example, calls from a service 110 of the provider environment to a customer resource. In some embodiments, however, the session token with be reissued for an internal or trusted resource or service, where the restriction is not to be enforced. In some embodiments, the customer-allocated resources 118 in the resource provider environment 106 may be trusted, and therefore may not have the restriction enforced. In the example of FIG. 1, however, the customer resources are under a type of customer control that causes them to be considered part of a customer environment 124, or customer account environment, that can be considered to be untrusted, or at best semi-trusted. Accordingly, the IP address restriction can be enforced on calls from resources 124 in the customer environment 124 as well.

Thus, in one example a customer device 102 can make a call into a customer resource 118 with the session token. This call would undergo authentication and have the transitive restriction enforced. If, however, the customer device called into a service 110 that then called into the customer resource 118 using a new or reissued session token without the restriction, or using the same session token but outside the scope of the restriction, the call from the customer device 102 to the service would have the restriction enforced, but a subsequent call from the service 110 to the customer resource would not have the restriction enforced. While there is a risk that the service 110 could make end up making a call to the customer resources 118 on behalf of an unauthorized third party 124 due to the lack of restriction enforcement on that call, the initial call from the third party 124 to the service would have the restriction enforced, such that the subsequent call would not be made from the service as the call from the third party would be denied. Similarly, if a call to the service is generated from a customer resource, such as a virtual machine instance, for the service, an authentication check can be made whereby the IP restriction is enforced to ensure that the request is received from a valid customer resource. Such an approach thus provides for configurable transitive source IP address restriction with respect to the various sources of requests for the resource provider environment. As mentioned, in at least some embodiments the IP address restriction is validated only during authentication, and not during authorization.

In some embodiments the session manager 114 and/or token manager 116 can provide an API, or other such interface, that enables a caller to set a restriction to be evaluated at the authentication level. The API also can enable the caller to set the transitivity of the restriction to allow, or disallow, the downstream callers from using the session permissions. Such an API can provide for control over IP restriction, and can support several use cases were restriction is to be enforced at authentication. Such an API can also be allowed to be called by various internal services 110, such as internal whitelisted services. An advantage to a transitive address restriction is that the services, components, or systems inside the trusted environment are not restricted from using the session tokens, as in certain conventional approaches, as the session token restrictions are not enforced for at least some of these calls as discussed herein. In at least some embodiments the transitivity or restriction can be set to false on vended sessions so that the restriction only is enforced on the call from the customer, or other external device to the internal systems or services, which can then call other internal systems or services on behalf of the customer without the restriction being enforced. In some embodiments, the address restriction is enforced for authentication and not authorization, which inherently specifies a type of transitivity for the restriction. As mentioned, using a source address at the authentication level, instead of at the authorization level, can protect the customer account as a whole, as the authentication check is performed before any authorization is performed, and a failure of authentication due to source address restriction will prevent a call from ever reaching the authorization stage.

FIGS. 2A through 2D illustrate the impact of an example transitivity of source address restriction that can be utilized in accordance with various embodiments. In this example, the source address restrictions are only enforced when an authentication is required and/or performed. For example, in the situation 200 of FIG. 2A a customer device 202 submits a request that includes a session token 204. Because this is an external call, the call must be passed to an authentication process 206 that can authenticate an identity associated with the request. Along with the authentication, the an IP source restriction can be enforced such that the request can be passed to a customer resource 210 of a customer account environment 208 only if the IP address of the customer device 202 is within the allowable range of the restriction. This can include any appropriate range, such as within from 10.0.0.0 to 10.255.255.255, among other such options. In some embodiments, a service 222 might make a call or request on behalf of the customer, as illustrated in the situation 220 of FIG. 2B. In this example, a call from the trusted service 222 to the customer resource 210 that includes the session token 204 does not have to undergo a separate authentication, but instead can be passed to an authorization process 224 which does not enforce the IP restriction. Thus, as long as the session token is valid and any authorization criteria are satisfied, the request can be processed. In the example illustrated, the service will obtain a new session token, or reissued version of the session token, for which the restriction is not to be enforced. The replacement token issued to the service in some embodiments will have the restriction removed. In this way, the request from the service with the new session token will not have the restriction enforced, such that the call from the service endpoint will not be denied due to not falling within the permissible address range.

Figure 2A:
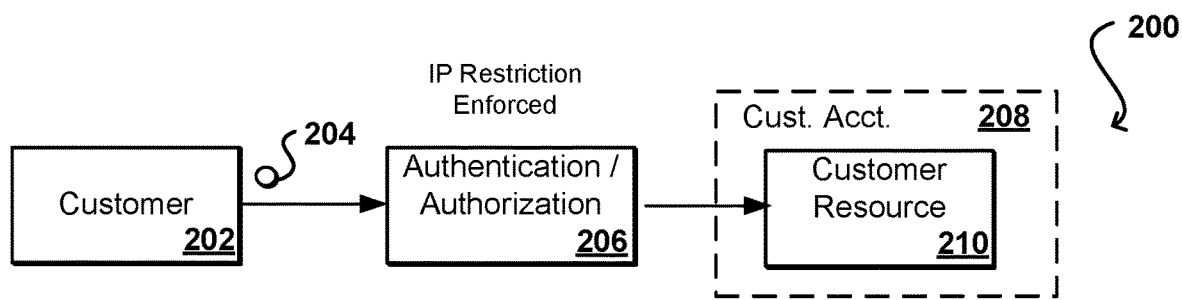
FIGS. 2A, 2B, 2C, and 2D illustrate an example approach for selectively enforcing a restriction on a credential that can be utilized in accordance with various embodiments.
Figure 2B:
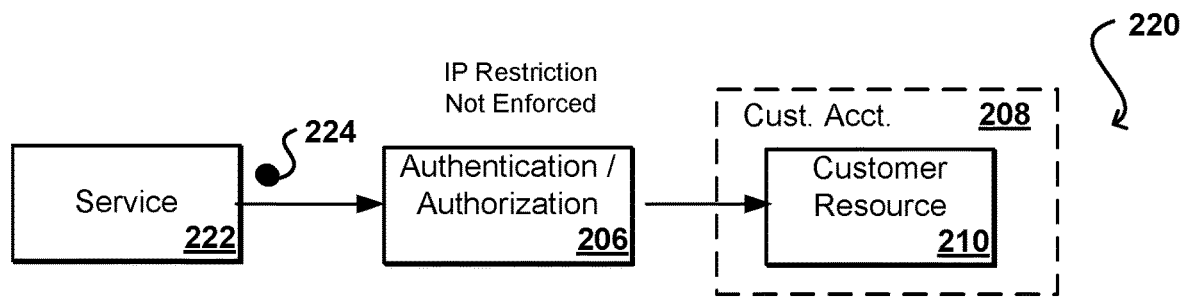
Figure 2C:
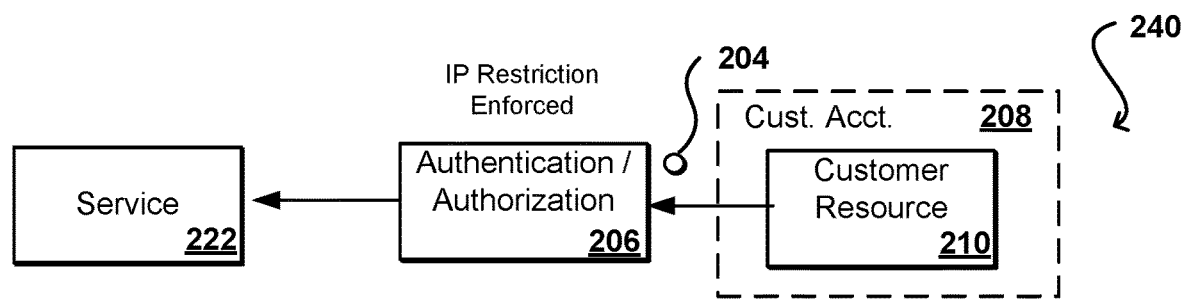
Figure 2D:
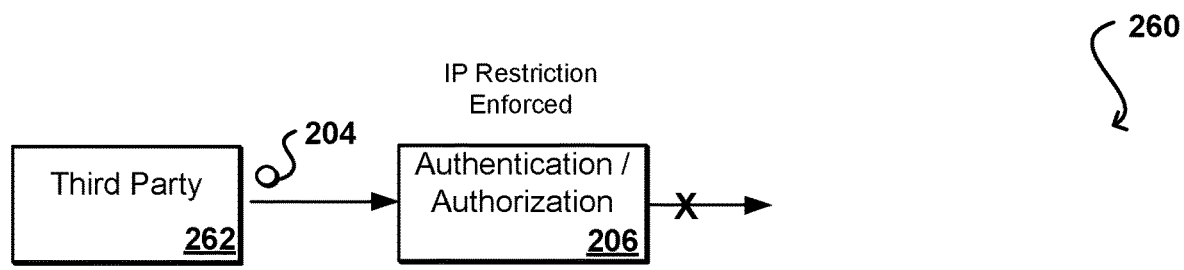

It might be the case that a request is submitted from a customer resource 210 in a customer account environment 208, as illustrated in the example situation 240 of FIG. 2C. Since the request is from outside a trusted environment, the request will again have to go through an authentication process 206. Accordingly, the IP address restriction will be enforced along even though the customer resource is inside the resource provider environment and the request is accompanied by a valid session token 204. As mentioned, if a request is received from a third party 262 that obtained a copy of the session token, as illustrated in the example situation 260 of FIG. 2D, the IP address of the third party will likely fall outside the allowed IP range, unless the party is associated with the customer or otherwise happens to have an IP address that falls within the associated range. When the request is passed to the authentication process 206, the IP address restriction will be enforced and the request will be denied. This prevents any internal calls from being made on behalf of the third party even with a valid session token because the initial call from the third party will fail the IP enforcement at authentication.

Figure 3:
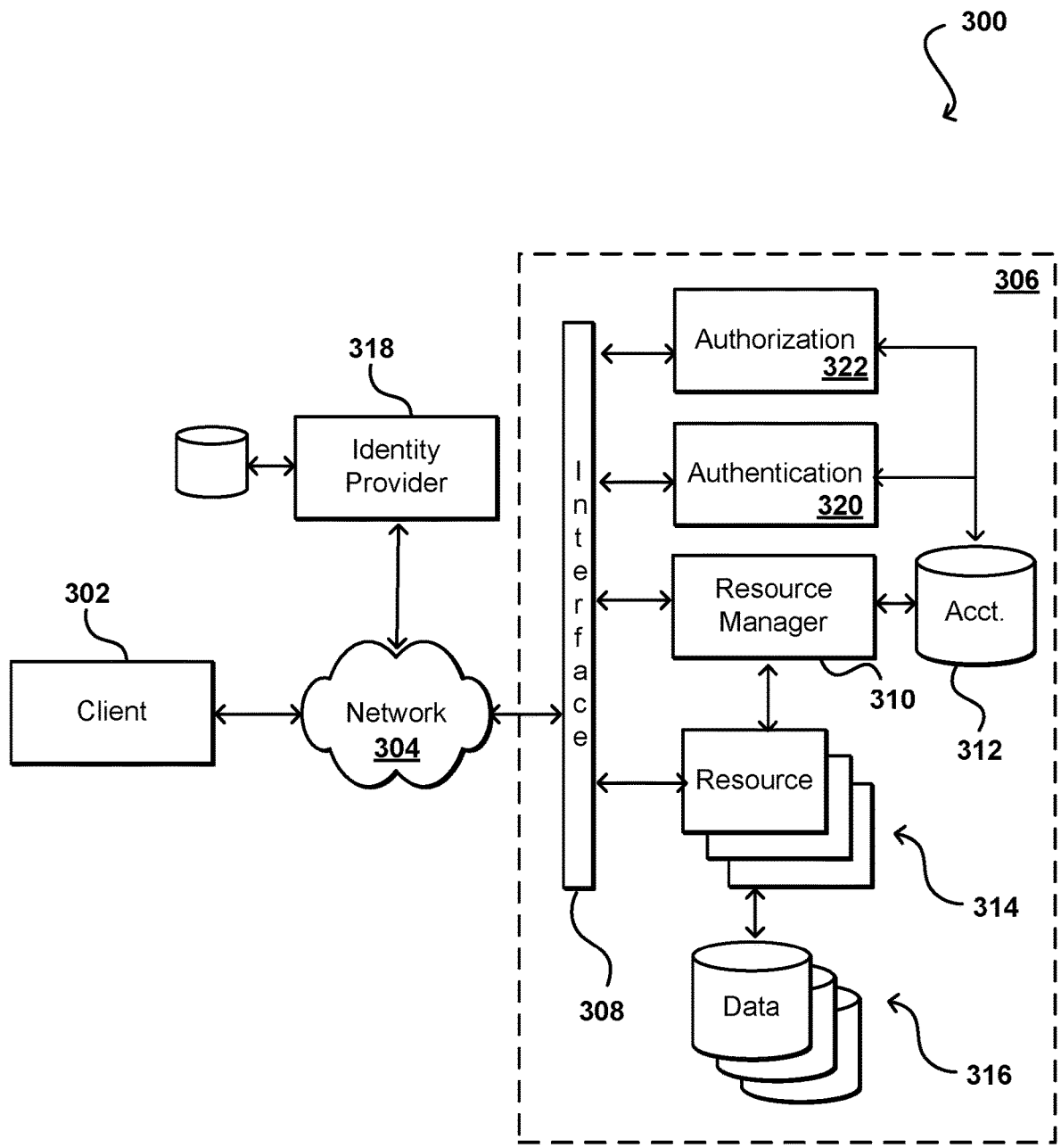
FIG. 3 illustrates an example environment for managing customer resources that can be utilized in accordance with various embodiments.

FIG. 3 illustrates an example environment 300 in which aspects of the various embodiments can be implemented. This example environment includes a set of resources 314 of a resource environment that can each be allocated to one or more customers as discussed herein. In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 318, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 306 and/or to the client device 302, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, credentials provided by, or on behalf of, a user or client device can demonstrate that the source of a request for access has been authenticated, and can be used to verify that the source of the request is authorized to obtain, directly or indirectly, that access. This can include, for example, a resource or component in the resource provider environment 306 assuming a role of the user, or customer of the resource provider environment, in order to act on behalf of the user. This has the advantage to the user that a client or other component for the user can obtain access to the resources to obtain a series of tasks, without having to provide the credentials, or obtain new credentials, for every task. A potential downside, however, is that an unauthorized third party gaining access to, or a copy of, the credentials can also use them to assume the role of the user, and thus obtain similar access to the resources of the resource provider environment.

The system in FIG. 3 also illustrates example authentication 320 and authorization components 322, although these could be part of the same system, service, or component in various embodiments. The interface layer 308 receiving requests from outside the trusted environment 306 can cause the requests to be directed to the authentication component 320, which in some embodiments can do source address restriction such that the request will fail or be denied if the source address falls outside the permissible range. If the call or request comes from within the trusted environment 306, the call may still be passed to the authentication and/or authorization components, but the source address will not be enforced and a request with a valid session token can be processed as long as any other criteria are satisfied. Any of a number of conventional authentication and/or authorization approaches can be used as known in the art, such that these approaches and mechanisms will not be discussed in further detail herein.

Figure 4:
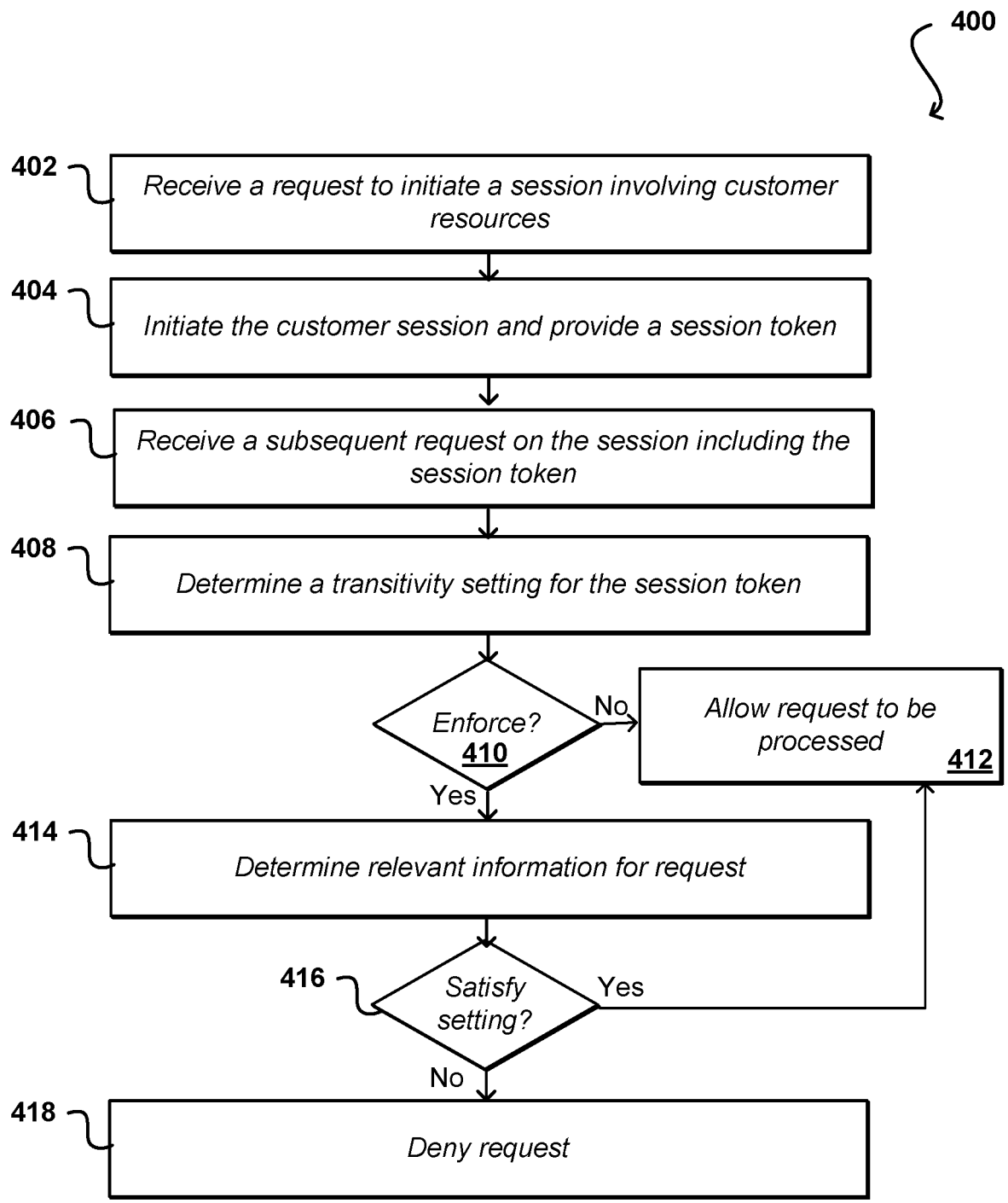
FIG. 4 illustrates an example process for transitively enforcing a source address restriction that can be utilized in accordance with various embodiments.

FIG. 4 illustrates an example process 400 for transitive enforcement of source address restriction that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 402 to initiate a session involving customer resources. This may be a request from a customer device in some embodiments, which includes one or more credentials capable of being used to authenticate a source of the request as being associated with a customer account or other such allocation. The credentials can be authenticated and the relevant account information determined, and if successful then a customer session can be initiated 404 in response to the request. Further, a session token can be generated that can be submitted with future requests on the session, in order to enable those requests to be processed on the session. The session token can be provided to the source of the request, such as a client device, which can store the session token locally, such as in cache memory. If a session is already active and the customer is able to join the session, then in some embodiments a session token can be provided that corresponds to the active session. As mentioned, the token may have a limited lifetime in some embodiments and will expire at the end of that lifetime, such that another authentication may need to be performed.

Subsequently, a request can be received 406 on the customer session that includes the session token. In order to determine whether to grant and/or process the request, a transitivity setting can be determined 408 for the session, or at least for the session token to be issued. This can include, for example, enforcing a source address restriction for any request received from outside a trusted environment, requests received to a specific interface or type of interface, a specific type of request, a type of target of the request, or any request requiring authentication that includes the session token, among other such options discussed and suggested herein. If it is determined 410 per the transitivity setting that the restriction should not be enforced for this request, then the request can be allowed 412 to be processed if any other processing criteria are satisfied. This may be the case when an intermediate service has the session token reissued, and the restriction is not to be enforced for the reissued token. If, however, the restriction is to be enforced, then information for the request can be determined 414 that is relevant to the transitivity setting. This can include, for example, a source address, communications path, type of end point, hardware token or other out-of-band proof of identity, date or time of the request, or instance identifier, among other such options. As mentioned, this can be an IP address from which the request originated, among other such options. If it is determined 416 that the source address is within the permissible range 416 then the request can be allowed 412 to be processed, assuming any other processing criteria are satisfied. If the source address is outside the permissible range of the restriction then the request can be denied 418 or the processing can otherwise fail.

Figure 5:
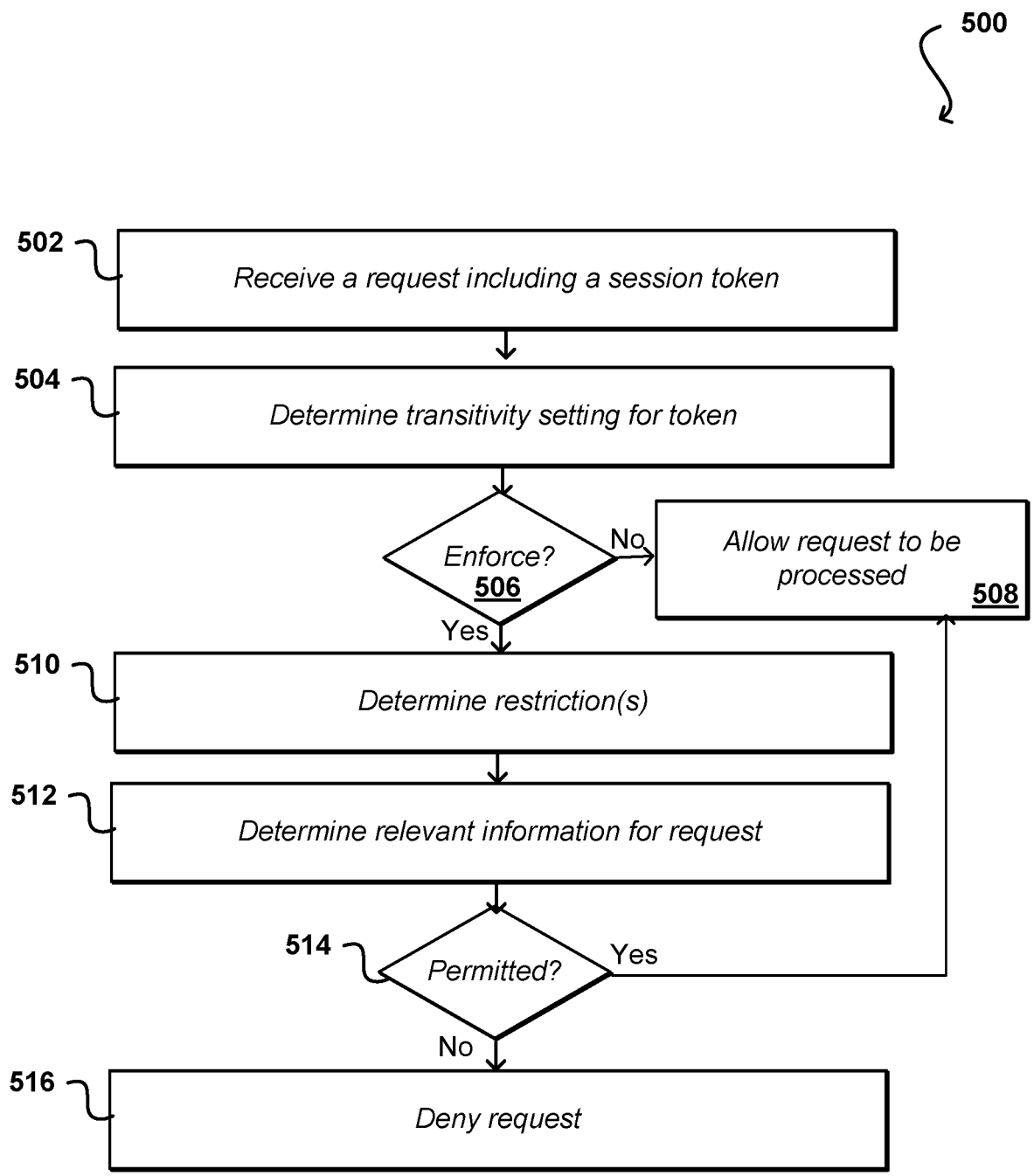
FIG. 5 illustrates an example process for enforcing source address restrictions only at authentication stages that can be utilized in accordance with various embodiments

FIG. 5 illustrates an example process 500 for enforcing source address restrictions at authentication that can be utilized in accordance with various embodiments. In this example, a request is received 502 that includes a session token. In at least some embodiments the session token can be analyzed to ensure that the token is valid, and corresponds to an active session, before processing the request. In this example a transitivity setting is determined 504 for the token. As mentioned, in some instances a restriction is to be applied for a request from an untrusted environment or source that requires authentication, while in other embodiments this can include determining whether the token for the request is of a type for which a restriction is to be enforced, among other such options. If it is determined 506 that there is no restriction to enforce then the request can be allowed 508 to be processed, assuming any other authentication and validity requirements are satisfied, etc. If there are restrictions to be enforced then the restriction(s) can be determined

510, as may be contained within the token or associated with the token, source, type of call, type of target resource, or other such option. The relevant information for the request can be determined, which as discussed can include information such as a source address, communications path, type of end point, hardware token or other out-of-band proof of identity, date or time of the request, or instance identifier, among other such options. The information can be compared against the restriction(s) to determine 514 whether the request or call is permitted to be processed, executed, or otherwise acted on. For example, a determination can be made as to whether a source IP address for the call is in a permissible range. If so, then the request can be allowed 508 to be processed. If not, the request can be denied.

Figure 6:
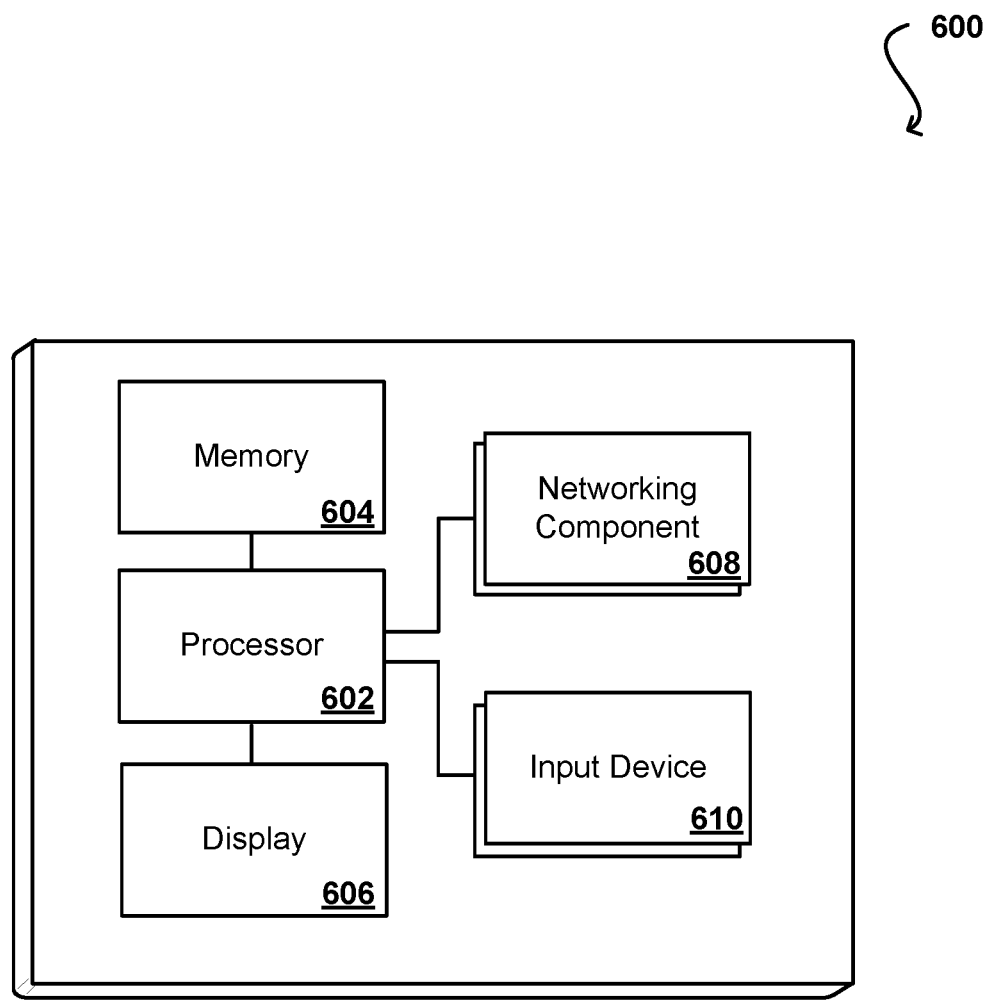
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
    generating a session token to be used for calls on a session of a trusted resource environment;

setting a source address restriction for the session token to permit the calls, when the calls are received from a source address satisfying the source address restriction, the source address restriction based at least in part on one or more of a predetermined communications path of Internet Protocol (IP) addresses or a type of end point on the predetermined communications path;

causing one or more resources allocated to a customer for the session to be logically contained within a single customer account environment, the single customer account environment considered, based at least in part on the predetermined communications path, to be outside the trusted resource environment; and applying a transitivity setting for the session token so that the source address restriction is only enforced for calls made from outside the trusted resource environment.

2. The computer-implemented method of claim 1, further comprising:

receiving a request for a service to submit a forwarded request on behalf on an entity associated with the session token, the service provided using one or more electronic resources inside the trusted resource environment; and reissuing the session token with a transitivity setting indicating that the source address restriction is not to be enforced for calls made using the reissued session token.

3. The computer-implemented method of claim 1, further comprising:

specifying the transitivity setting so that the source address restriction is enforced during an authentication before processing on the session.

4. The computer-implemented method of claim 1, further comprising:

denying a request, containing the session token and for which the source address restriction is to be enforced, in response to determining that a source address for the request falls outside a permissible range indicated by the source address restriction.

5. A computer-implemented method, comprising:

initiating a session in a service environment;

generating a session token associated with a transitive restriction for calls made on the session, the transitive restriction relating to at least one of a source address, a predetermined communications path, a type of communications end point, a hardware token, a date or time of a respective call, or an instance identifier;

causing one or more resources allocated to an entity for the session to be logically contained within a single account environment, the single account environment considered to be outside the trusted resource environment, based at least in part on application of the predetermined communications path;

causing the transitive restriction to be enforced for calls made from outside a trusted region of the service environment; and processing the calls that satisfy the transitive restriction.

6. The computer-implemented method of claim 5, further comprising:

determining information for a received call including the session token, the received call being one of the calls made on the session;

comparing the information against the transitive restriction; and determining whether the received call satisfies the transitive restriction before determining to perform the processing of the received call.

7. The computer-implemented method of claim 5, further comprising:

receiving a scope of the transitive restriction to determine which of the calls are to have the transitive restriction enforced.

8. The computer-implemented method of claim 5, further comprising:

enforcing the transitive restriction during authentication before processing on the session.

9. The computer-implemented method of claim 5, further comprising:

determining that the session token is valid for the session before processing a received call that includes the session token, the received call being one of the calls made on the session.

10. The computer-implemented method of claim 5, further comprising:

receiving an initial request associated with a customer account, the initial request including at least one customer credential;

validating the customer credential before initiating the session; and transmitting the session token to a source of the initial request for submission with the calls on the session.

11. The computer-implemented method of claim 5, further comprising:

receiving a request for a service to submit a request on behalf on an entity associated with the session token, the service provided using one or more electronic resources inside the service environment; and reissuing the session token with a transitivity setting indicating that the source address restriction is not to be enforced for calls made using the reissued session token.

12. A system, comprising:

at least one processor; and memory including instructions that, when executed by the at least one processor, cause the system to:

initiate a session in a service environment;

generate a session token associated with a transitive restriction for calls made on the session, the transitive restriction relating to at least one of a source address, a predetermined communications path including a permission range of Internet Protocol (IP) addresses, a type of communications end point, a hardware token, a date or time of a respective call, or an instance identifier;

cause one or more resources allocated to an entity for the session to be logically contained within a single account environment, the single account environment considered to be outside the trusted resource environment, based at least in part on application of the predetermined communications path;

cause the transitive restriction to be enforced for calls made from outside a trusted region of the service environment; and process the calls that satisfy the transitive restriction.

13. The system of claim 12, wherein the instructions when executed further cause the system to:

determine information for a received call including the session token, the received call being one of the calls made on the session;

compare the information against the transitive restriction; and determine whether the received call satisfies the transitive restriction before determining to perform the processing of the received call.

14. The system of claim 12, wherein the instructions when executed further cause the system to:
   apply a transitivity setting for the session, the transitivity setting indicating when to enforce the source address restriction for the calls made on the session.

15. The system of claim 12, wherein the instructions when executed further cause the system to:
   receive a scope of the transitive restriction to determine which of the calls are to have the transitive restriction enforced.

\* \* \* \* \*